United States Patent
Huang et al.

(10) Patent No.: US 12,122,102 B2
(45) Date of Patent: Oct. 22, 2024

(54) COLOR SURFACE FORMATION BY SINGLE-COLOR 3D PRINTING

(71) Applicant: Hewlett-Packard Development Company, L.P., Spring, TX (US)

(72) Inventors: Wei Huang, Palo Alto, CA (US); Nathan Moroney, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 239 days.

(21) Appl. No.: 17/424,720

(22) PCT Filed: May 29, 2019

(86) PCT No.: PCT/US2019/034286
§ 371 (c)(1),
(2) Date: Jul. 21, 2021

(87) PCT Pub. No.: WO2020/242463
PCT Pub. Date: Dec. 3, 2020

(65) Prior Publication Data
US 2022/0072802 A1 Mar. 10, 2022

(51) Int. Cl.
| | |
|---|---|
| *B29C 64/393* | (2017.01) |
| *B33Y 10/00* | (2015.01) |
| *B33Y 50/02* | (2015.01) |
| *G06T 7/50* | (2017.01) |
| *G06T 7/60* | (2017.01) |
| *G06T 7/90* | (2017.01) |
| *G06T 17/00* | (2006.01) |

(52) U.S. Cl.
CPC ............ *B29C 64/393* (2017.08); *B33Y 10/00* (2014.12); *B33Y 50/02* (2014.12); *G06T 7/50* (2017.01); *G06T 7/60* (2013.01); *G06T 7/90* (2017.01); *G06T 17/00* (2013.01)

(58) Field of Classification Search
CPC ....... B29C 64/393; B33Y 10/00; B33Y 50/02; G06T 7/50; G06T 7/90; G06T 7/60; G06T 17/00
See application file for complete search history.

(56) References Cited

U.S. PATENT DOCUMENTS

| | | | | |
|---|---|---|---|---|
| 5,722,209 A | * | 3/1998 | Delaney | ............... B44C 5/043 144/329 |
| 6,521,325 B1 | | 2/2003 | Engle et al. | |
| 7,727,431 B2 | | 6/2010 | Saueressig | |
| 7,830,569 B2 | | 11/2010 | Tai et al. | |
| 8,057,729 B2 | | 11/2011 | Stone et al. | |

(Continued)

FOREIGN PATENT DOCUMENTS

| | | |
|---|---|---|
| EP | 2186625 A2 | 5/2010 |
| GB | 2559914 A | 8/2018 |

*Primary Examiner* — Darrin D Dunn
*Assistant Examiner* — Yvonne Trang Follansbee
(74) *Attorney, Agent, or Firm* — Shook, Hardy & Bacon L.L.P.

(57) ABSTRACT

The present disclosure pertains to systems and methods for mapping an image to a three-dimensional pattern of relief features on a surface of an object for 3D printing. In some examples, a system may determine a pattern of relief features, including debossed relief features and/or embossed relief features, to create a shading pattern on the surface of 3D printed object that approximates the continuous halftones of an image.

13 Claims, 6 Drawing Sheets

(56) References Cited

U.S. PATENT DOCUMENTS

| | | |
|---|---|---|
| 8,848,233 B2 | 9/2014 | Gullentops et al. |
| 9,628,635 B1 * | 4/2017 | Palanivel ............... H04N 1/405 |
| 9,827,712 B2 | 11/2017 | Snyder et al. |
| 2002/0159094 A1 * | 10/2002 | Bybell ................ H04N 1/4056 |
| | | 358/3.1 |
| 2016/0278986 A1 | 9/2016 | Gross et al. |
| 2017/0132836 A1 * | 5/2017 | Iverson .................. G06T 17/10 |
| 2018/0001566 A1 | 1/2018 | Morovic et al. |
| 2018/0370138 A1 | 12/2018 | Voina et al. |
| 2021/0155028 A1 * | 5/2021 | Wattyn .................... B41M 1/04 |

* cited by examiner

COLOR SURFACE FORMATION BY SINGLE-COLOR 3D PRINTING

BACKGROUND

Three-dimensional printing allows for objects to be three-dimensionally printed using single-color or multi-color materials. In some instances, images are printed on objects after they have been three-dimensionally printed. For instance, images can be printed or adhered to an object after printing using multiple colors or a single color. Multi-color three-dimensionally printed designs allow for images to be printed on the surface of the object using multiple colors of print material.

BRIEF DESCRIPTION OF THE DRAWINGS

Non-limiting and non-exhaustive examples of the disclosure are described, including various examples of the disclosure, with reference to the figures, in which.

DETAILED DESCRIPTION

Figure 1:
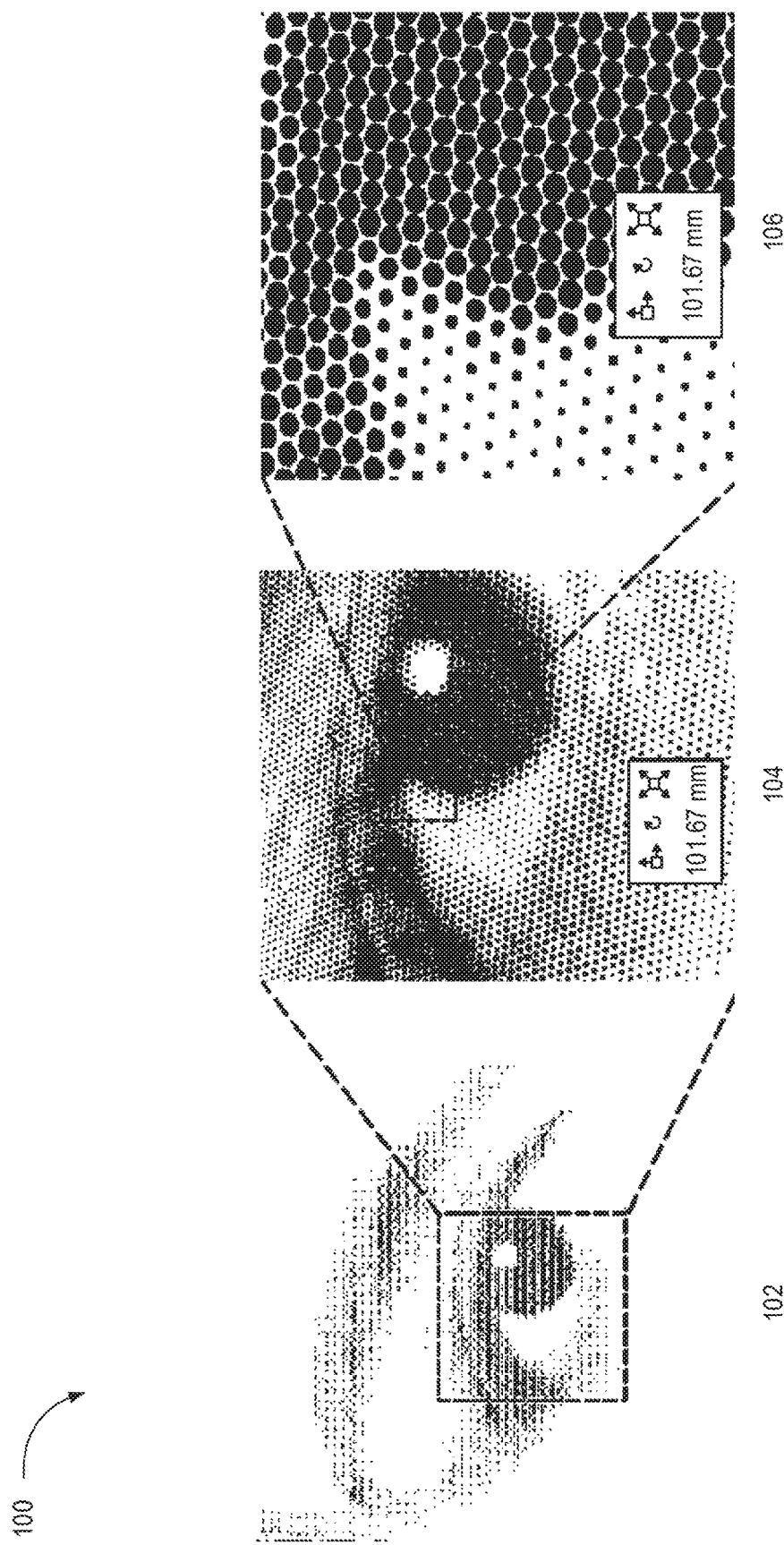
FIG. 1 illustrates an example of an image represented as a grayscale image, a halftone image, and a relief features image.

Visual imagery and depth may be part of a design of an object for three-dimensional (3D) printing. For example, a design for 3D printing may include an image on a surface of an object. To print an image on an object, the surface of the object may be printed with material having different tones and/or colors. In other examples, as described herein, relief features are printed on the surface of a 3D object to provide a visual representation of a halftoned image.

The present disclosure enhances the ability to print an image on a surface of an object as a grayscale representation of the image (shades of gray) or other halftone representation of the image (shades of another color) utilizing a single-color print material. For instance, a 3D printed grayscale image may be printed on an object utilizing a single gray print medium. Similar halftone images of print mediums of other colors are also possible. Utilizing a single color may obviate the need for print materials of more than one printing color or printing or adhering an image to the surface of an object after it has been 3D printed.

Examples consistent with the present disclosure may be utilized with a variety of communication devices. A communication device, as the term is used herein, includes any device capable of accepting and forwarding data traffic. The communication device may also be referred to as a client device and/or a user device. In some examples, a 3D printer may serve as the communication device. In addition to the functionality of accepting and forwarding data traffic, communication devices may also perform a wide variety of other functions and may range from simple to complex devices.

The examples in this disclosure may be further understood by reference to the drawings, wherein like parts are designated by like numerals throughout. It will be readily understood that the components of the disclosed examples, as generally described and illustrated in the figures herein, could be arranged and designed in a wide variety of different configurations. Thus, the following detailed description of the examples of the systems and methods of the disclosure is not intended to limit the scope of the disclosure, as claimed, but is merely representative of possible examples of the disclosure. In addition, the steps of a method do not necessarily need to be executed in any specific order, or even sequentially, nor need the steps to be executed only once, unless otherwise specified.

In some cases, well-known features, structures, or operations are not shown or described in detail. Furthermore, the described features, structures, or operations may be combined in any suitable manner in one or more examples. It will also be readily understood that the components of the examples as generally described and illustrated in the figures herein could be arranged and designed in a wide variety of different configurations.

Several aspects of the examples described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain examples, a particular software module or component may comprise disparate instructions stored in different locations of a memory device, which together implement the described functionality of the module. Indeed, a module or component may comprise a single instruction or many instructions and may be distributed over several different code segments, among different programs, and across several memory devices. Some examples may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Examples may be provided as a computer program product, including a non-transitory computer and/or machine-readable medium having stored thereon instructions that may be used to program a computer (or another electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMS, EPROMs, EEPROMs, magnetic or optical cards, solid-state memory devices, or other types of machine-readable media suitable for storing electronic and/or processor-executable instructions.

FIG. 1 illustrates an example image represented as a grayscale image 102, a halftone image 104, and a relief features image 106. In this example, the relief features image 106 utilizes debossed features to create a grayscale image on a surface of a 3D printed object. The grayscale transitions system 100 shows the transition of the image. Here, the grayscale image 102 depicts the image of an eye in grayscale. The halftone image 104 depicts the grayscale image 102 utilizing halftones. The relief features image 106 depicts debossed features corresponding to the halftones of halftone image 104. In some examples, the image may be markings, words, patterns, or other displays. These debossed features may be printed relative to the surface of an object. For example, the debossed features may be printed relative to the surface of a plate. In some examples, the object (e.g., plate, mug, etc.) may be 3D printed. The relief features image 106 may be printed utilizing single-color 3D printing for color surface formation. In some examples, the printed discretized pattern of relief features on the surface of the object may simulate the continuous grayscale tones of the image.

In some examples, a discretized pattern of relief features for the relief features image 106 may be based on the image 102. Specifically, the relief features image 106 is based on the grayscale image 102 of a picture of an eye. In some examples, the image may be the words "I LOVE NY" in grayscale. The grayscale image 102 may be mapped to a pattern of relief features. In some examples, the grayscale image 102 may be converted to the halftone image 104, and the pattern of relief features may be generated corresponding to the halftone image 104. In some examples, a halftone pattern may be generated. The pattern of relief features may then be utilized to generate a 3D print design to print the image on a surface of an object. In some examples, the 3D print design may be analyzed to determine a location of each relief feature of the image to be printed. In some examples, the 3D print design may be analyzed to determine a perimeter dimension for each relief feature to be printed. An output may be generated based on these determinations.

Figure 2:
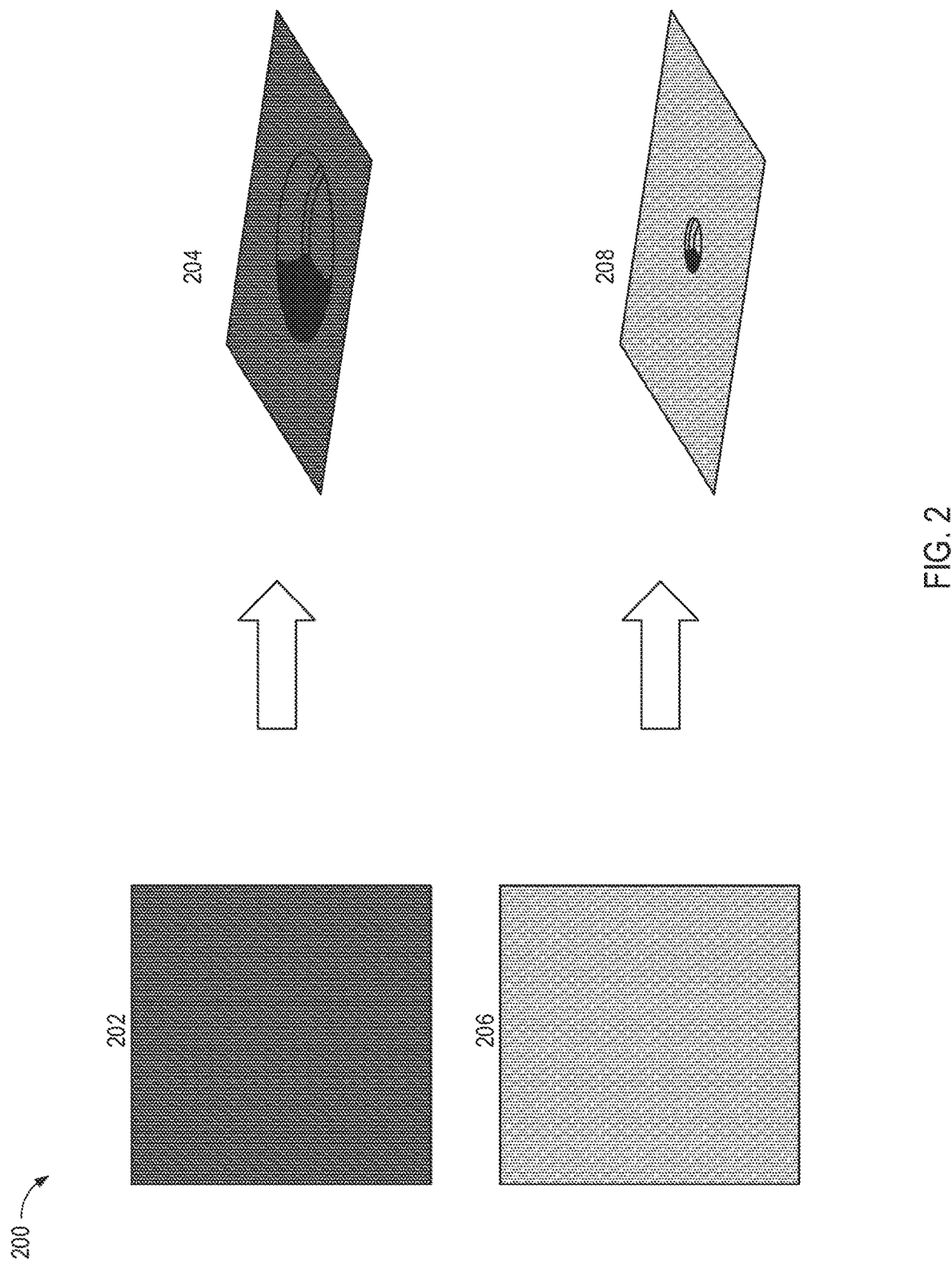
FIG. 2 illustrates a perspective view of an example of debossed features corresponding to a halftone pattern.

FIG. 2 illustrates a perspective view of an example of debossed features corresponding to a halftone pattern. The debossed images 200 displayed demonstrate a correlation between the perimeter dimension of the debossed feature and the light trapped. Changing the perimeter dimension of the debossed feature changes the shade of the feature based on photon reflection and capture. The larger the perimeter dimension of the debossed feature the higher rate of photon capture. Higher photon capture corresponds to a darker shade. For example, a shade 202 of a debossed feature 204 is darker than a shade 206 of a debossed feature 208. Shade 202 is darker than shade 206 due to the perimeter dimension of each debossed feature. A larger debossed feature produces a darker shade. For example, debossed feature 204 is larger than debossed feature 208, therefore shade 202 is darker than shade 206. To ensure the shading corresponds to the grayscale image, the perimeter dimension of the debossed feature may be based on corresponding halftones of the halftone pattern associated with the image. A perimeter dimension of each debossed feature may be determined to utilize the halftone pattern associated with the image. In some examples, the perimeter dimension of the debossed feature may be based on a diameter of a circle. The diameter may have a direct correlation with the halftone associated with the debossed feature. For example, a first halftone may be a first size and a second halftone may be half the first size. In this example, the first debossed feature associated with the first halftone may have a diameter of a first size and a second debossed feature associated with the second halftone may have a diameter half the size of the first debossed feature's diameter. In some examples, the depth of the debossed feature is determined by the corresponding halftone. In some examples, the depth is constant between all debossed features. The areas surrounding the debossed features 204, 208 may represent the surface of the 3D design of the object for 3D printing.

Figure 3:
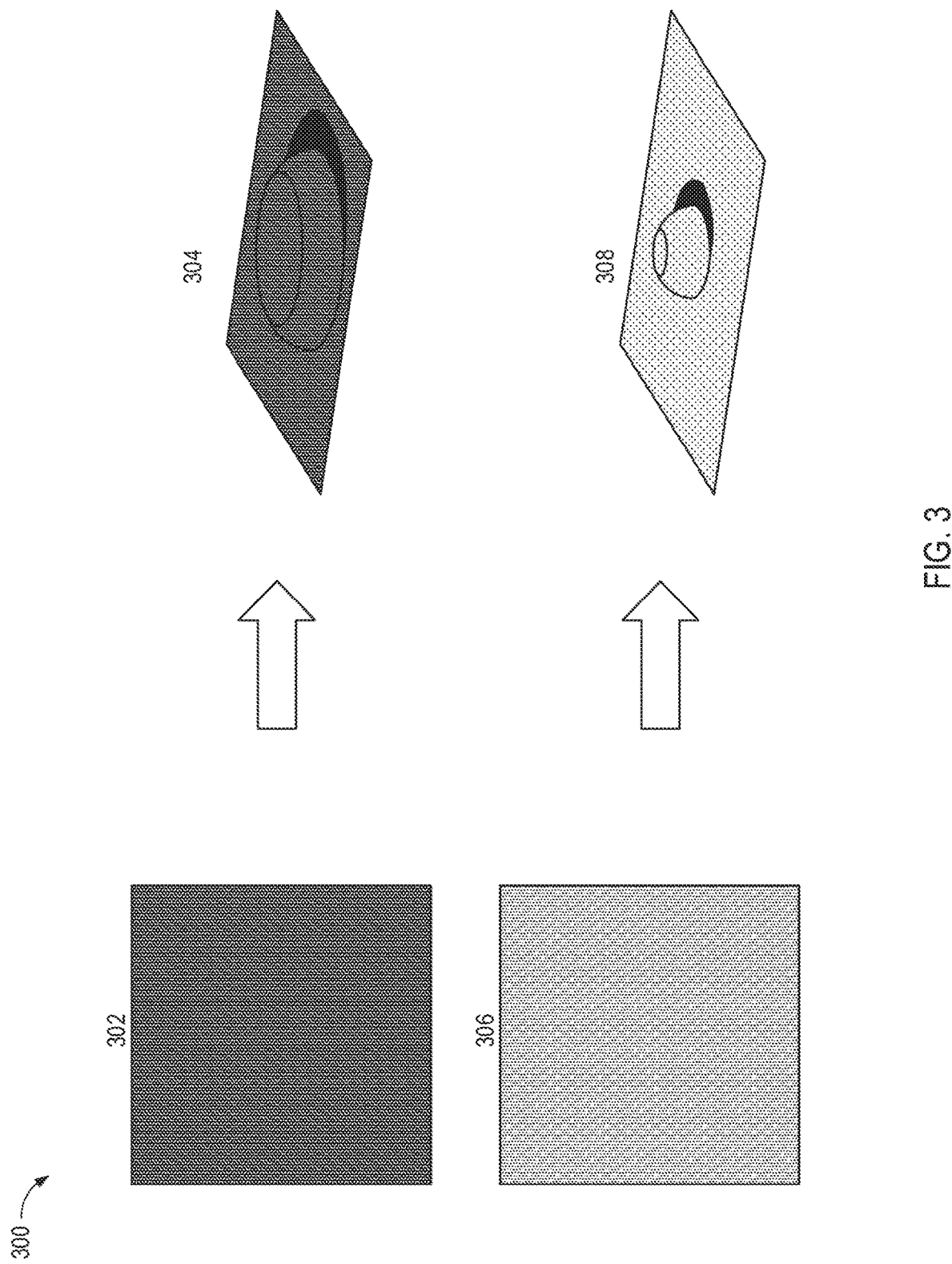
FIG. 3 illustrates a perspective view of an example of embossed features representing grayscale pixels.

FIG. 3 illustrates a perspective view of an example of embossed relief features corresponding to a halftone pattern. The embossed images 300 displayed demonstrate a correlation between the perimeter dimension of the embossed features 304 and 308 and the shadow created. The areas surrounding the embossed features 304 and 308 represent the surface of the object for 3D printing. Changing the perimeter dimension of the embossed feature changes the average shade of a given area on the surface of the object for 3D printing. The size of the shadow increases as the perimeter dimension and/or height of the embossed feature increases. Higher photon reflection from the surface of larger embossed features (in a direction away from the viewer) corresponds to an overall darker shade on the surface of the object due to the increased percentage of the surface covered in shadow. For example, a shade 302 of an embossed feature 304 is darker than a shade 306 of an embossed feature 308. Shade 302 is darker than shade 306 due to the perimeter dimension of each embossed feature. The larger embossed feature 304 produces a darker shade due to the larger shadow.

The perimeter dimension of each embossed feature is selected to correspond to target halftones of the halftone pattern associated with an image. In some examples, each relief feature (e.g., each debossed or embossed feature) may be circular. The diameter may have a direct correlation to the perimeter dimension of the halftone associated with the relief feature. For example, a first halftone may be a first size and a second halftone may be half the first size. In this example, the first embossed feature associated with the first halftone may have a first diameter and a second embossed feature associated with the second halftone may have a second diameter that is one half the diameter of the first embossed feature. In some examples, a depth or height of a debossed or embossed feature is selected to achieve a target halftone. In some examples, the depth (or height) of each relief feature is constant and only the perimeter dimension is varied to achieve different halftones. In other examples, the perimeter dimension of each relief feature is constant and the depth (or height) of each relief feature is varied to achieve target halftones.

In the illustrated examples, the relief features have circular perimeters. However, it is appreciated that alterative shapes may be utilized, including ovals and polygons having any number of sides. Using any shape variation or combination of shapes, portions of each relief feature may be rounded or curved to achieve a smooth overall surface texture of the 3D printed object. For instances, the embossed relief features 304 and 308 in FIG. 3 circles with larger base diameters connected to smaller top diameters via curved surfaces to reduce hard angles and 90-degree edges. In other example, corners, cones, and/or polygonal shapes having edges or points may be utilized to achieve a target texture.

Figure 4:
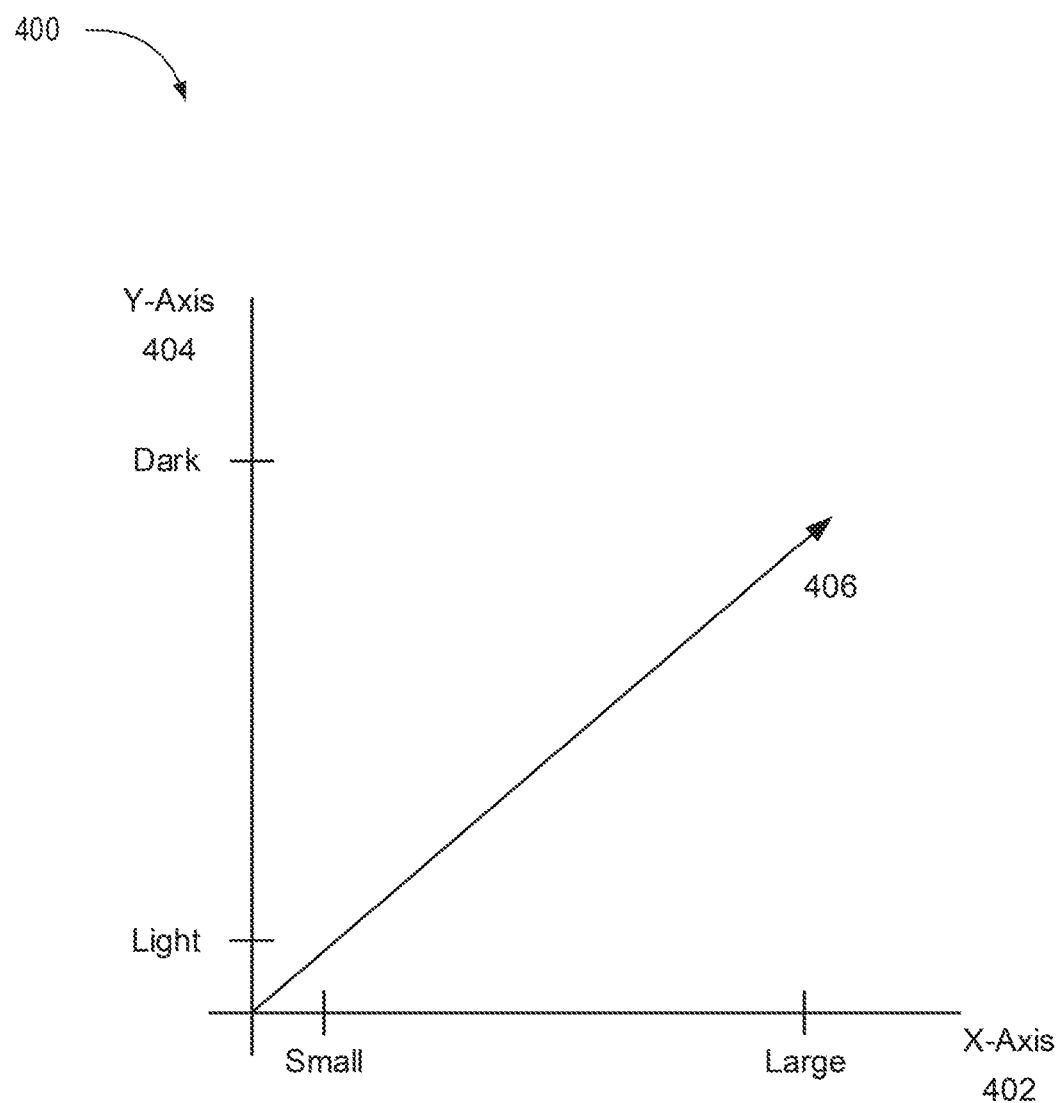
FIG. 4 illustrates a graph depicting the association between size of a relief feature and shade of grayscale.

FIG. 4 illustrates an example graph 400 depicting the association between the perimeter dimension of a relief feature and the shade of the relief feature. The x-axis of the graph 400 represents a perimeter dimension 402 of the relief feature. The y-axis represents a shade 404 of the relief feature. A line 406 represents the relationship between the perimeter dimension 402 and the shade 404. Here, line 406 demonstrates that as the perimeter dimension 402 of the relief feature grows, the shade 404 of the relief feature becomes darker. As the perimeter dimension 402 grows, more light is captured and/or photon refection occurs. As more light is captured and/or photon reflection occurs, the shade 404 becomes darker.

Figure 5:
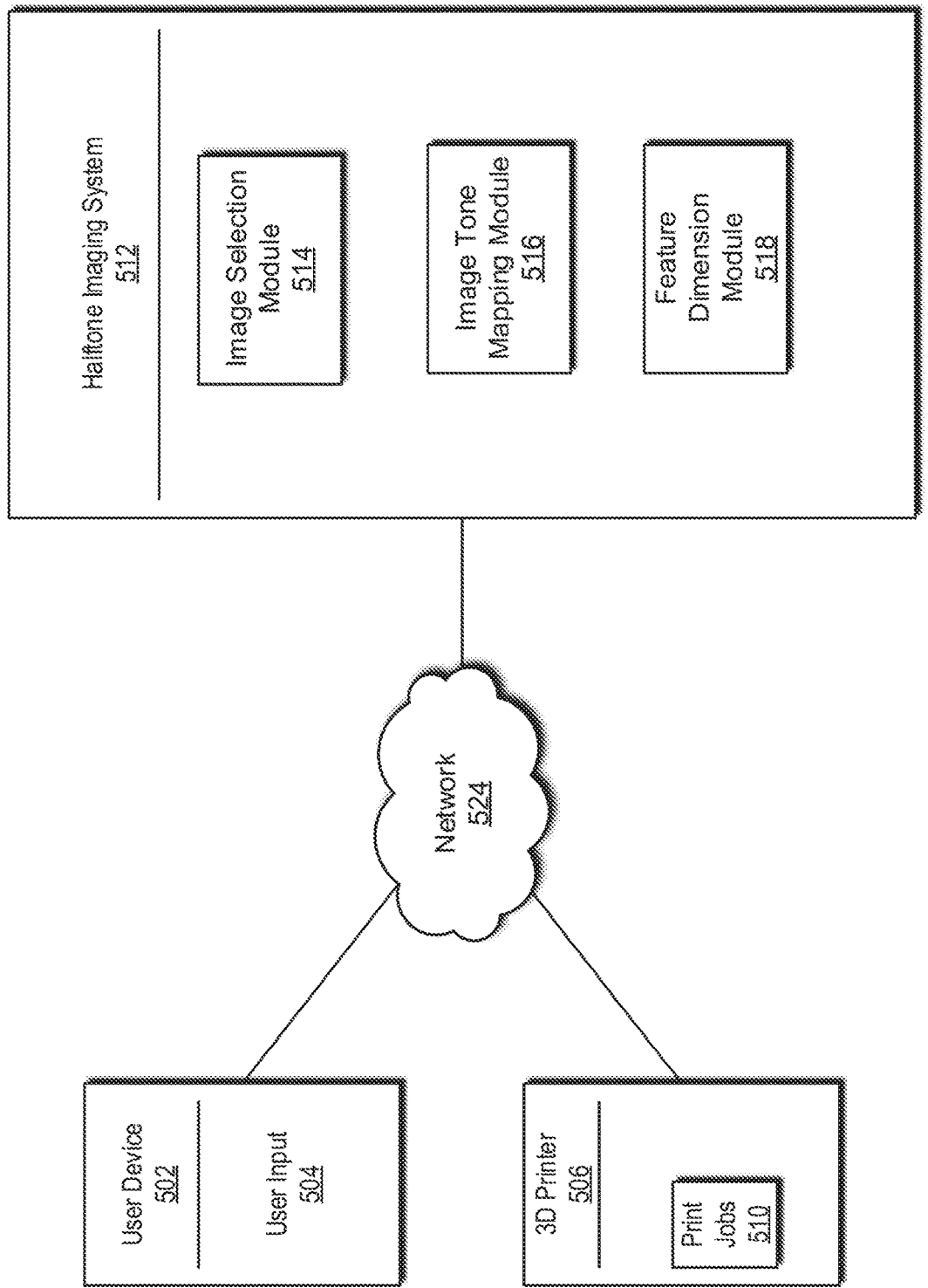
FIG. 5 illustrates a block diagram of a halftone imaging system as a member of a grayscale determination system.

FIG. 5 illustrates a block diagram of a user device 502, a 3D printer 506, and a halftone imaging system 512, The halftone imaging system 512 maps an image to a 3D pattern of relief features on a surface of an object to be printed via the 3D printer 506. In some examples, the user device 502, the 3D printer 506, and the halftone imaging system 512 communicate via a network 524. The halftone imaging system 512 may be an independent system or, alternatively, integrated as part of the 3D printer 506 and/or user device 502. For instance, the 3D printer 506 may include an integrated user device 502 and/or the user may interact with a touchscreen user input 504 integrated as part of the 3D printer 506.

In other examples, the user device 502 may be physically connected to the 3D printer 506 or remotely connected to the 3D printer 506 via, for example, the network 524. The halftone imaging system 512 may include a processor and the modules 514, 516, and 518 may comprise instructions stored within a non-transitory computer-readable medium that are implementable by the processor. In other examples, the modules 514, 516, and 518 may be implemented as hardware, software, and/or firmware as part of an electronic control system associated with the user device 502 and/or the 3D printer 506.

The user input 504 of the user device 502 may enable a user to select an image via an image selection module 514 of the halftone imaging system 512. In other examples, the image may be automatically selected by the image selection module 514. The halftone imaging system 512 maps an image to a pattern of relief features to be printed by the 3D printed 506. For instance, an image tone mapping module 516 may determine a tonal map of an image. The tonal map of the image may, for example, be represented as a two-dimensional array of pixels, where each pixel is identified by a greyscale value between 0 and 255 (e.g., in a 256-bit greyscale tonal map). The image tone mapping module 516 may originally determine or downsample the tonal map of the image based on the print resolution and the minimum feature size capabilities of the 3D printer 506. For instance, default or user-specified maximum and minimum relief feature dimensions may constrain the resolution and/or effective bit-depth of the tonal reproduction.

As an example, the image tone mapping module may determine a downsampled tonal map of an 8-bit, 100-pixel by 100-pixel image for mapping to 5 mm×5 mm regions of a 100 mm×100 mm surface of an object. In such an example, the 100-pixel by 100-pixel image may be downsampled to a 20-pixel by 20-pixel image for 1:1 mapping between pixels and 5 mm×5 mm regions on the surface of the object. The 3D printer may be capable of selectively printing circular relief features having a diameter between 0.3 mm and 4.5 mm, in increments of 0.3 mm, on each 5 mm×5 mm area of the surface of the object. In such an example, 16 different halftones are available for printing. A 5 mm×5 mm area on the surface of the object with no relief feature (i.e., a relief feature having a 0.0 mm diameter) is the lightest halftone corresponding to the base tone of the print material. A 0.3 mm relief feature represents the next lightest shade, while a 4.5 mm relief feature represents the darkest shade. In increments of 0.3 mm, the 16 available halftones are represented by relief features having diameters of 0.0 mm, 0.3 mm, 0.6 mm, 0.9 mm, 1.2 mm, 1.5 mm, 1.8 mm, 2.1 mm, 2.4 mm, 2.7 mm, 3.0 mm, 3.3 mm, 3.6 mm, 3.9 mm, 4.2 mm, and 4.5 mm.

In such an example, the 8-bit image (with a possible 256 different tones) may be downsampled to a halftone image with only 16 different tones and reproduced with each pixel mapped to one of the 5 mm×5 mm areas on the surface of the object. The feature dimension module 518 may determine a diameter for each relief feature on each 5 mm×5 mm region of the surface of the object to match the halftone of the downsampled image. The forgoing example provides very specific dimensions that are merely representative of one possible example and implementation. In various alternative examples, the size of each region on the surface of the object may be larger (e.g., 7 mm×7 mm) or smaller (e.g., 1 mm×1 mm). Similarly, the range of relief feature diameters may be larger or smaller and the incremental sizes of each relief feature may vary. For instance, a 3D printer with a resolution of 0.02 mm may be capable of representing approximately 64 different halftones within surface regions having areas of approximately 1.5 square-millimeters.

In some examples, a depth (of a debossed relief feature) or a height (of an embossed relief feature) may be varied to achieve a wider tonal range. For instance, each relief feature may have a selectable depth of 0.3 mm, 0.6 mm, or 0.9 mm. In such an example, the number of different reproducible halftones triples. In the 16-bit halftone example above with 5 mm×5 mm surface regions, the image tone mapping module 516 may determine a downsampled 46-tone, 20-pixel by 20-pixel tonal mapping of the selected image.

In the 1.5 square-millimeter example above, the selectable depths (or heights) may be, for example, 0.25 mm, 0.5 mm, 0.75 mm, and 1.0 mm, which effectively increases the selectable tonal range to include approximately 256 different tones. The feature dimension module 518 may determine a diameter and a depth of each debossed relief feature (or a height of each embossed relief feature) to be printed on each 5 mm×5 mm region of the surface of the object to be printed.

In some examples, such as the example described above, the relief features are debossed features. In other examples, the relief features are embossed features. In still other examples, the relief features are a combination of embossed features and debossed features. In some examples, debossed features may provide a first number of tones and embossed features may provide a second number of non-overlapping tones. In such an example, the feature dimension module 518 may determine dimensions of each feature as well as whether such a feature should be embossed or debossed to achieve a target tone.

The halftone imaging system 512 may output a file (e.g., a print job 510) to the 3D printer 506 that includes just the pattern of relief features to be printed on the object (i.e., not the design file for the object itself). In other examples, the halftone imaging system 512 provides the 3D printer 506 with a modified 3D design file (e.g., a print job 510) that includes the pattern of relief features integrated into the 3D design of the object to be printed (i.e., a modified design file for the object).

The 3D printer 506 may utilize instructions from the print jobs 510 to, for example, control multi jet fusion (MJF) print heads of an MJF printer to produce the pattern of relief features on a surface of an object being 3D printed. For instance, the print jobs 510 may provide instructions for controlling a print head, depositing a fusing agent, and/or depositing a detailing agent. The print jobs 510 may include instructions for any of a wide variety of alterative 3D printer types to produce the pattern of relief features corresponding to the selected image.

The printing substance or "print material" may include powered substances, such as metals, polymers, ceramics, and/or other printing substances. In some examples, a single color may be utilized to print the object and the relief features corresponding to the halftone image on the surface of the object. The dimensions of the relief features (e.g., diameter, depth, length, width, height, perimeter, etc.) may be adapted to accommodate resolution limitations of a given printer. For example, the nozzle used for fused deposition modeling (FDM) or fused filament fabrication (FFF) may dictate a minimum feature size for the relief features based on a maximum achievable print resolution.

Similarly, the size of powder particles used in an MJF 3D printer may dictate a maximum achievable resolution and associated minimum relief feature size. For example, relief features may be printed to have diameters ranging from 0.5 mm to 5.0 mm to achieve a spectrum of halftones. In some examples, the density of relief features on the surface of an object may be further utilized to achieve an overall halftone in a surface region of an object. The range of dimensions for the relief features may be automatically determined and/or user-specified based on the total size of the object to be 3D printed and/or an expected viewing distance. For instance, design parameters may dictate that a diameter of relief features not exceed 3 mm based on an expected viewing distance.

Figure 6:
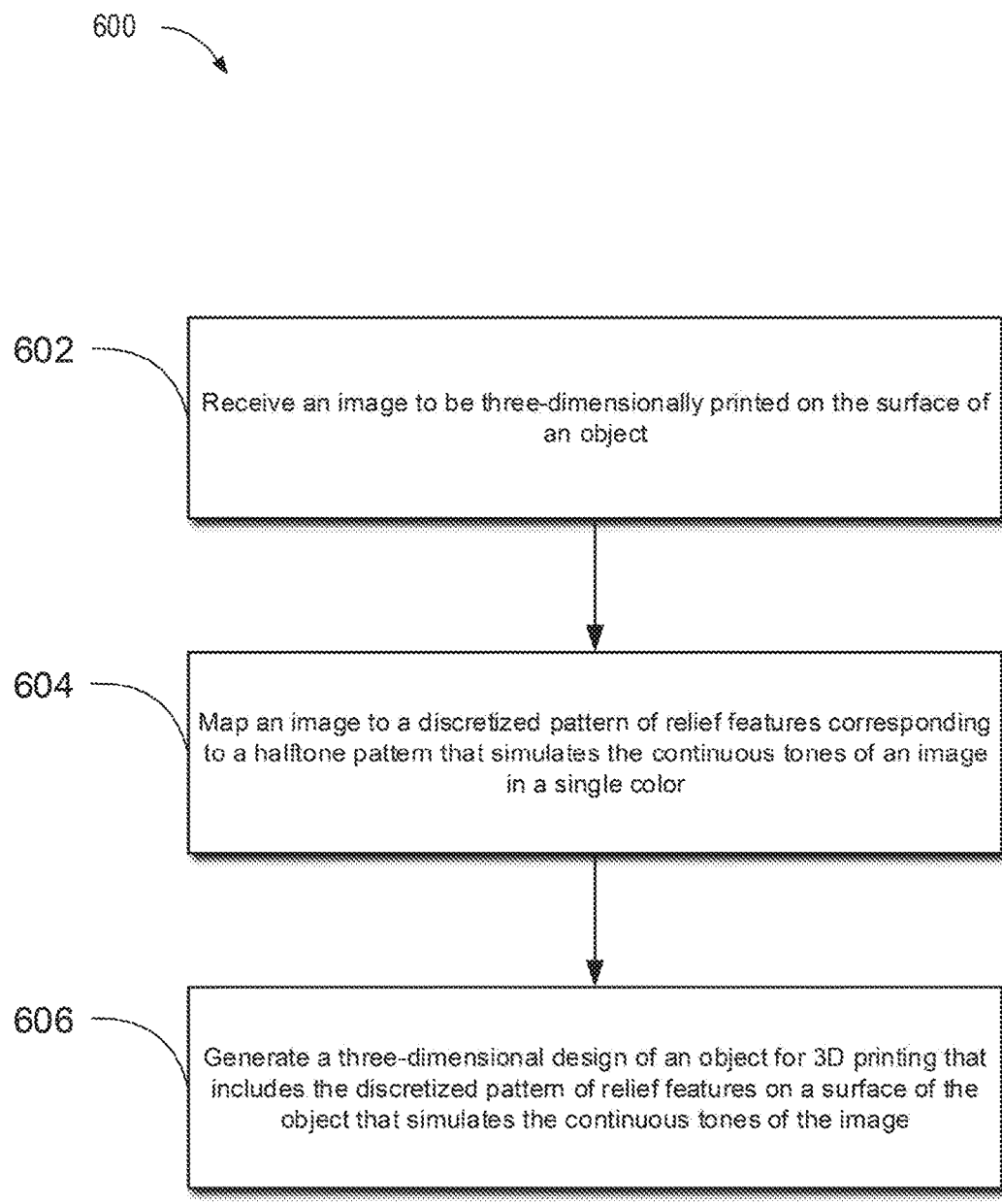
FIG. 6 illustrates a flowchart of a method for mapping an image to a three-dimensional pattern of relief features on a surface of an object for three-dimensional printing.

FIG. 6 illustrates a flow chart 600 of a method that may be implemented in software, firmware, hardware, and/or a combination thereof. At 602, an image is received to be three-dimensionally printed on the surface of an object. In some examples, a user may select the image utilizing a user device connected to a user input. In other examples, the selection process is automated. For example, the image on the surface of the object may be an integral part of the object selected for 3D printing.

At 604, the image may be mapped to a discretized pattern of relief features corresponding to the halftone pattern that simulates the continuous tones of an image, for example, using a single-color print material. In some examples, the relief features may be debossed features. In other examples, the relief features may be embossed features. In still other examples, the relief features may be both debossed and embossed features. As described in conjunction with FIG. 5, the resolution and minimum feature size of the 3D printer likely dictate the resolution and tonal range reproducible on the surface of a 3D printed object of a given size.

While many variations are possible, another specific example with specific features sizes may facilitate additional understanding. An object may, for example, have a 300 mm by 300 mm surface on which an image can be printed. The surface may be divided into 3 mm×3 mm regions, within each of which a relief feature can be printed. The 3D printer may, for example, be capable of printing circular debossed relief features having diameters of either 0.8 mm, 1.6 mm, or 2.4 mm. If pixels from a 100-pixel by 100-pixel image are mapped on a 1:1 basis to each 3 mm×3 mm region, the 3D printed image would have a very limited 4-bit tonal range. In contrast a downsampled 25-pixel by 25-pixel image can be mapped on a 1:16 basis with each pixel of the image being reproduced by 16 of the pixels. Given the 4-bit tonal depth of each 3 mm×3 mm region, the resulting 3D printed image would have a lower resolution (25-pixels by 25-pixels), but the tonal range would increase to include 64 different shades.

It is appreciated that 3D printers capable of printing higher resolution and/or smaller minimum feature sizes may also allow for smaller surface regions. A 3D printer capable of printing with a 5-micron resolution could print relief features on 1 mm×1 mm surface regions with more than 200 different tonal shades.

Once the image is mapped to a pattern of relief features having defined dimensions, the system may generate, at 606, a modified 3D design of the object to be 3D printed that includes the discretized pattern of relief features on a surface of the object. For instance, a basic design file of the object to be 3D printed may have specified (relatively) smooth surface. The basic design file may be modified to include the pattern of relief features, including, for example, diameters of each relief feature and a depth or height of each relief feature. Once printed, the discretized pattern of relief features creates shadows of varying sizes based on the dimensions of each relief feature to create an overall halftone image on the surface of the object. The pattern and dimensions of the relief features are selected to simulate the continuous tones of the image, even when using a single-color print medium.

As previously noted, many of the examples of relief features described herein have circular base shapes; however, it is appreciated that any shape of debossed or embossed relief feature may be used to create shadows (either cast shadows by embossed relief features or shadowed cavities of debossed relief features). Furthermore, the surface regions on which each relief feature is printed are described herein using rectangular examples (e.g., 5 mm×5 mm or 3 mm×3 mm). However, again, it is appreciated that a wide variety of uniform or non-uniform polygonal shapes, circles, or ovals may be utilized. In non-uniform examples, the density of relief features may further affect the tonal mapping of an image.

While specific examples and applications of the disclosure have been illustrated and described, it is to be understood that the disclosure is not limited to the precise configurations and components disclosed herein. Accordingly, many changes may be made to the details of the above-described examples without departing from the underlying principles of this disclosure. The scope of the present invention should, therefore, be determined only by the following claims.

In the description above, various features are sometimes grouped together in a single example, figure, or description thereof for the purpose of streamlining the disclosure. This method of disclosure, however, is not to be interpreted as reflecting an intention that may claim now presented or presented in the future requires more features than those expressly recited in that claim. Rather, it is appreciated that inventive aspects lie in a combination of fewer than all features of any single foregoing disclosed example. The claims are hereby expressly incorporated into this Detailed Description, with each claim standing on its own as a separate example. This disclosure includes all permutations and combinations of the independent claims with their dependent claims.

What is claimed is:

1. A system, comprising:
   a processor; and
   a non-transitory computer-readable medium with instructions stored thereon that, when implemented by the processor, cause the system to perform operations for mapping an image to a three-dimensional (3D) pattern of relief features on a surface of an object for 3D printing, the operations comprising:

identifying an image to be printed on a surface of a 3D design of the object for 3D printing;

mapping the image to a discretized pattern of relief features corresponding to halftones simulating the continuous grayscale tones of the image; and generating a modified 3D design of the object for 3D printing that includes the pattern of relief features to simulate the continuous grayscale tones of the image, wherein the modified 3D design is configured for 3D printing using a single color with the pattern of relief features simulating the continuous grayscale tones of the image by selective photon reflection and capture, wherein the higher the selective photon capture the darker the shade occurs and the lower the selective photon capture the lighter the shade occurs.

2. The system of claim 1, wherein each relief feature in the pattern of relief features comprises an embossed relief feature relative to the surface of 3D design of the object for 3D printing.

3. The system of claim 1, wherein each relief feature in the pattern of relief features comprises a debossed relief feature relative to the surface of the 3D design of the object for 3D printing.

4. The system of claim 1, wherein the pattern of relief features comprises a combination of embossed and debossed relief features relative to the surface of the 3D design of the object for 3D printing.

5. The system of claim 1, wherein the operations further comprise:

determining a perimeter dimension of each relief feature in the pattern of relief features.

6. The system of claim 5, wherein determining the perimeter dimension of each relief feature comprises determining a diameter of a circle for each relief feature.

7. The system of claim 1, wherein the operations further comprise:

determining at least one of a height and a depth of each relief feature in the pattern of relief features.

8. The system of claim 7, wherein the operations further comprise determining a perimeter dimension of each relief feature in the pattern of relief features having the determined height or depth dimension.

9. The system of claim 1, wherein identifying an image to be printed on the surface of the 3D design of the object for 3D printing comprises receiving a grayscale image to be printed on an existing 3D design of an object for 3D printing.

10. A method, comprising:

mapping an image to a discretized pattern of relief features corresponding to a halftone pattern that simulates the continuous grayscale tones of an image; and generating a three-dimensional (3D) design of an object for 3D printing that includes the discretized pattern of relief features on a surface of the object that simulates the continuous grayscale tones of the image;

wherein the object for 3D printing is configured for 3D printing using a single color with the discretized pattern of relief features simulating the continuous grayscale tones of the image by selective photon reflection and capture, wherein the higher the selective photon capture the darker the shade occurs and the lower the selective photon capture the lighter the shade occurs.

11. The method of claim 10, further comprising determining dimensions of each relief feature in the discretized pattern of relief features based on a selected angle of observation.

12. The method of claim 10, further comprising determining dimensions of each relief feature in the discretized pattern of relief features to simulate the continuous grayscale tones of the image on a discontinuously curved surface of the object for 3D printing based on a simulated observation location spatially defined with respect to the object for 3D printing.

13. The method of claim 10, wherein each relief feature in the pattern of relief features comprises one of an embossed relief feature and a debossed relief feature, relative to the surface of the object for 3D printing.

* * * * *